May 8, 1928. 1,668,569
M. MURRY
EDUCATIONAL GAME
Filed Aug. 15, 1927
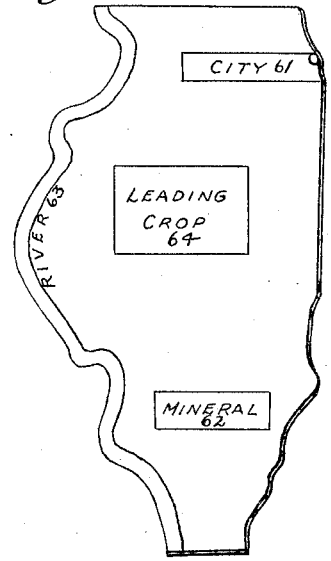
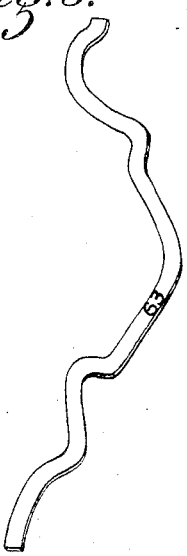
INVENTOR:
MARY MURRY.
By Arthur C Eckert
ATTORNEY.

Patented May 8, 1928.

1,668,569

UNITED STATES PATENT OFFICE.

MARY MURRY, OF ST. LOUIS, MISSOURI.

EDUCATIONAL GAME.

Application filed August 15, 1927. Serial No. 213,063.

The object of my invention is to make an educational game as well as one that is amusing. A further object is to make a game that is instructive in different fields. A more specific object is to make a game that may be played by any number of individuals, that may be easily learned, that has few rules, and the physical parts of which may be easily and cheaply made.

With these and other objects in view, my invention has relation to certain novel features of construction and arrangement of parts as will be hereinafter more fully described, pointed out in the claims and illustrated in the drawing in which, Fig. 1 represents the front face of the map of the State of Illinois made of card board or other material and having designated thereon by rectangles and names the words "City", "Leading crop", and "Mineral".

Fig. 2 designates the front face of a piece of card board or other material having the conformation of a rectangle shown in Fig. 1 and designated "City". On this piece of card board is printed the legend "Chicago". Fig. 3 designates a piece of card board having the legend "Corn" imprinted thereon. This piece of card board is of the same configuration as the configuration in Fig. 1 upon which is printed "Leading crop". Fig. 4 designates a piece of card board or other member having the legend "Coal" imprinted thereon and of the same configuration as the rectangle on Fig. 1, having the designation "Mineral" imprinted thereon. Fig. 5 designates the configuration of the river designated on Fig. 1 and having the words "Mississippi River" imprinted thereon. Fig. 6 represents the reverse side of Fig. 5 and has the numeral 63 imprinted thereon. Fig. 7 designates the reverse side of Fig. 2 and has the numeral 61 imprinted thereon. Fig. 8 designates the reverse side of Fig. 3 and has the numeral 64 imprinted thereon. Fig. 9 designates the reverse side of Fig. 4 and has the numeral 62 imprinted thereon.

This game may be advantageously played by pupils in a school room but its application is not thus limited.

When played in a school room, each child receives a card board similar to that disclosed in Fig. 1, representing an outlined map of one of the States of the Union.

On this State map (as shown in Fig. 1) the pupil sees plainly indicated the questions for which answers must be found. On the teacher's desk the pieces of card board such as indicated in Figs. 2, 3, and 4, will be placed with the reverse sides up, that is to say, in the positions shown in Figs. 7, 8, and 9. The teacher or a pupil who has no map removes the topmost piece of card board, for instance that shown in Fig. 7, from the pile of small card boards and reads aloud the number found thereon, that is, 61, and states "I will give it to the pupil who needs it, that is, the pupil who has the number 61 on his map, provided said pupil will tell me the name that is written thereon". The teacher then reverses the card board shown in Fig. 7 and if the pupil announces "Chicago", the teacher then gives the card board shown in Fig. 7 to the pupil who places it on the map shown in Fig. 1 over the rectangle having the legend "City" thereon, with the side having the legend "Chicago" thereon upper most.

The teacher then takes the next succeeding piece of card board such as shown in 64 and proceeds.

If the pupil holding the number corresponding to the card announced by the teacher fails to make the proper statement or no statement, that piece of card board is placed aside and is not counted in the score. The pupil who first covers the rectangles on the map before him or the other configurations before him wins the game. It will be seen that the pupil to comply with the requirements of the game must be possessed of certain information, for instance, the first pupil in the illustration given must know the location of a city in the northeastern part of the State and must know that that city is Chicago. The second pupil must know that the leading crop in the central portion of Illinois is corn, and the third person must know that the leading product in the southern central portion of Illinois is a mineral and that that mineral is coal. The playing of the game impresses these facts on the pupil who already knows them or may have been uncertain concerning them and causes the pupil who does not know them to either look up the answers to the questions subsequently or to have them stated to him at the conclusion of the game. The configuration of the Mississippi River shown in Fig. 5 when properly identified by a pupil is placed on the configuration of the river shown in Fig. 1.

Instead of using maps of States of the United States, city maps may be used, in which case special points of interest such as the White House, Capitol, Washington Monument, and Lincoln Memorial may be indicated if the city of Washington were selected. Likewise different countries in the world may be taken. The game is not limited to geographical presentations. For instance, it may be likewise employed in the designation of birds, in which case each child would be given a card board having the configurations thereon of several birds but without their names and the small pieces of card board would contain the name of the bird indicated thereon. It might be played with flowers or photographs of prominent persons, etc. The game can likewise be played in groups in which each group takes a certain number of the small pieces of card board and the group securing the largest number of correct answer would be the winner.

What I claim and mean to secure by Letters Patent is:

1. A game comprising a geographical configuration with spaces indicated thereon and questions indicated in the spaces and members having the answers to the questions indicated on said geographical configurations imprinted thereon on one side and having numbers imprinted thereon on the reverse sides, which numbers correspond with the numbers placed on the configurations of said geographical configurations.

2. A game comprising a geographical configuration having questions and numbers indicated thereon, each question having a number and separate independent members having the answers to said questions imprinted thereon on one side, one answer on each member, and the number corresponding to the questions on the geographical configuration imprinted on the reverse side thereof.

3. A game comprising an element on which are indicated questions, each question having a number and a separate independent member related thereto, each independent member having a corresponding number with an answer to the corresponding question.

In testimony whereof I affix my signature.

MARY MURRY.